(12) United States Patent
Fandrey et al.

(10) Patent No.: US 9,399,721 B2
(45) Date of Patent: Jul. 26, 2016

(54) METHOD OF SEALING SURFACES

(75) Inventors: Jens Fandrey, Pforzheim (DE); Elke Ehrmann, Karlsruhe (DE); Klaus Becker-Weimann, Karlsruhe (DE)

(73) Assignee: KLEBCHEMIE M.G. BECKER GMBH & CO. KG, Weingarten/Baden (DE)

( * ) Notice: Subject to any disclaimer, the term of this patent is extended or adjusted under 35 U.S.C. 154(b) by 1717 days.

(21) Appl. No.: 11/793,837

(22) PCT Filed: Dec. 22, 2005

(86) PCT No.: PCT/EP2005/013951
§ 371 (c)(1),
(2), (4) Date: Sep. 18, 2007

(87) PCT Pub. No.: WO2006/066954
PCT Pub. Date: Jun. 29, 2006

(65) Prior Publication Data
US 2008/0160216 A1 Jul. 3, 2008

(30) Foreign Application Priority Data
Dec. 22, 2004 (DE) .......................... 10 2004 061 771

(51) Int. Cl.
*B01J 19/08* (2006.01)
*C09D 175/04* (2006.01)
*B05D 7/08* (2006.01)
*B05D 7/00* (2006.01)
*C08G 18/10* (2006.01)

(52) U.S. Cl.
CPC ................ *C09D 175/04* (2013.01); *B05D 7/08* (2013.01); *B05D 7/52* (2013.01); *C08G 18/10* (2013.01); *B05D 2201/00* (2013.01); *B05D 2202/00* (2013.01); *B05D 2203/20* (2013.01); *B05D 2203/22* (2013.01)

(58) Field of Classification Search
CPC ............ B05D 7/08; B05D 7/52; C08G 18/10; C08G 18/307

USPC ....................................... 427/595, 508, 407.2
See application file for complete search history.

(56) References Cited

U.S. PATENT DOCUMENTS

| 4,501,635 A | 2/1985 | Siry et al. |
|---|---|---|
| 4,528,307 A | 7/1985 | Fuhr et al. |
| 4,741,597 A | 5/1988 | Broer |
| 5,494,707 A * | 2/1996 | Wang et al. ................ 427/412.1 |
| 6,601,357 B2 * | 8/2003 | Tunis .............................. 52/480 |
| 2002/0056938 A1 | 5/2002 | Hasenkamp et al. |
| 2003/0162892 A1 | 8/2003 | Maier et al. |
| 2004/0250906 A1 | 12/2004 | Becker-Weimann et al. |
| 2005/0255250 A1 | 11/2005 | Becker-Weimann et al. |

FOREIGN PATENT DOCUMENTS

| CA | 2535607 A1 | 3/2005 |
|---|---|---|
| CN | 85 1 08254 A | 4/1986 |
| DE | 19806136 A1 | 8/1998 |
| EP | 1386936 A1 | 2/2004 |
| WO | WO 92/10341 | 6/1992 |
| WO | WO-02/12407 A1 | 2/2002 |
| WO | WO-02/094457 A2 | 11/2002 |
| WO | WO-02/094549 A2 | 11/2002 |
| WO | WO-2004/000516 A1 | 12/2003 |
| WO | WO04000516 * | 12/2003 |
| WO | WO-2005/018833 A1 | 3/2005 |
| WO | WO-2006/002917 A2 | 1/2006 |

OTHER PUBLICATIONS

Machine translation of wo 2004000516 (2004).*

* cited by examiner

*Primary Examiner* — Elena T Lightfoot
(74) *Attorney, Agent, or Firm* — Birch, Stewart, Kolasch & Birch, LLP

(57) ABSTRACT

The present invention relates to an article whose surface has been at least partly sealed and to methods of its sealing, the sealing layer comprising a reactive melt layer and a coating layer. The invention provides a method of sealing at least part of the surface of an article, comprising the steps of: (a) applying a reactive melt layer based on polyurethane to at least one part of the surface of the article; (b) smoothing the reactive melt layer; and (c) applying a coating material to form a coating layer on the reactive melt layer, the coating layer being applied before the full curing of the reactive melt layer.

11 Claims, No Drawings

METHOD OF SEALING SURFACES

The present invention relates to an article whose surface has been at least partly sealed and to methods of its sealing.

In a very wide variety of fields of application at the present time coating materials are used as a sealing layer on the surface of articles in large quantities, such as in the furniture and wood-processing industries, but also in the case of articles made of steel, non-ferrous metals, plastic, paper, cardboard, papier-mâché or mineral substances.

One widespread coating system in this context comprises UV-curing coating materials, which are applied mostly by roller, more rarely by spraying, to the parts. The subsequent curing operation takes place with UV light or UV lamps. The mechanical complexity associated with coating with UV coating materials is very high and requires a very large amount of space. Another reason for the large amount of space required is that coating operations of UV-curing systems usually necessitate a plurality of applications. In practice, three to four applications are commonplace. With each application of coating material it is possible per operation to apply layers only about 10 to 20 μm thick because of the viscosity, but especially because of the UV curing through volume, which is why, generally speaking, two or more applications of coating material are required. Other coating systems as well, such as two-component PU coating materials, nitro lacquers or water-based coating materials, must likewise be applied in two or more layers. Additionally, surfacers, primers and, where appropriate, sanding operations in between are usually necessary here.

Advantages associated with coating materials, however, are that they can dry relatively quickly and thereafter have a high moisture resistance and resistance to cleaning products.

Owing to the necessity of multi-layer application of the layers of coating material, methods of sealing have been looked for that allow the sealing layer to be applied to an article in, as far as possible, one operation.

From DE 198 06 136 C2 it is known, in the case of a floorboard for wood-block flooring, having at least one wood layer and a sealing layer on its surface, to configure the sealing layer as a water-free and solvent-free reactive, polyurethane-based melt layer which cures with the atmospheric humidity. In that case the reactive melt layer is applied to the wood layer by knife coating, rolling or spraying.

WO-A 02/094549 and WO-A 02/094457 also propose a reactive, polyurethane-based melt layer for the sealing of a veneer or of a furniture component. In these cases the melt layer is smoothed using a roll, for example, in order to obtain a homogeneous surface. So that the melt does not stick to the roll in the course of the smoothing operation, the roll surface is provided with a release agent based on paraffin wax.

The advantage of the melt layer is that the desired layer thicknesses can be applied in one operation. Moreover, the cured melt still affords sufficient flexibility to avoid the formation of brittle cracks.

A disadvantage associated with the use of reactive melts, however, is the long residence time before the crosslinking and hence the complete curing are at an end. This time is generally a number of days, during which options for the further processing or packaging of the sealed articles are limited.

It is therefore an object of the present invention to provide an improved method of sealing that at least in part avoids the disadvantages outlined above.

This object is achieved by means of a method of sealing at least part of the surface of an article, comprising the steps of (a) applying a reactive melt layer based on polyurethane to at least one part of the surface of the article;
(b) if desired, smoothing the reactive melt layer;
(c) applying a coating layer to the reactive melt layer.

It has in fact been found that, surprisingly, the positive properties which are contributed by the use of layers of coating material or of reactive melt for sealing can be retained if a combined reactive melt/coating material sealing layer is used. Particularly surprising in this context is the fact that the reactive melt is able to cure despite being concealed, by the coating layer, from the ambient air, whose moisture is typically needed for crosslinking and hence for curing.

Likewise provided by the present invention is an article having a sealing layer on at least part of its surface, comprising a reactive melt layer based on polyurethane on at least part of the surface of the article, and a coating layer on the reactive melt layer.

The polyurethane-based reactive melt is preferably a commercially customary polyurethane-based reactive melt, which normally reacts by means of the moisture present in the ambient air and, in so doing, cures. This reactive melt is preferably water-free and solvent-free.

The preferably water-free and solvent-free reactive melt layer is typically applied to the area to be sealed at a temperature of at least 100° C., about 100° C. to 150° c., preferably 120° C. to 150° C. Here it is normally possible to apply about 20 to 150 g of reactive melt per square metre of surface to be coated. The reactive melt typically possesses a density of approximately 1.1 $g/m^2$ and a BROOKFIELD viscosity at 120° C. in the range from approximately 2000 mPas to 30 000 mPas, preferably 4000 mPas to 10 000 mPas. It is advantageous to apply the reactive melt layer in the absence of air and with shielding from atmospheric humidity, in order to prevent premature reaction. The layer may be applied by knife coating, rolling or spraying, for example, or by means of a nozzle or slot die. Even in the cured state, the reactive melt layer still has a certain residual elasticity.

The reactive melt layer preferably has a thickness in the range from 20 μm to 150 μm, more preferably from 80 μm to 100 μm.

Owing to the physical properties of the reactive melt, such a thickness can be produced by single application. The layer is therefore produced in a single ply. Since even this, among other things, represents an advantageous time saving, the single-ply application is preferred in the context of the present invention. Since, surprisingly, full curing of the reactive melt layer is not necessary before the coating layer is applied to it, it is preferred if the coating layer is applied before the full curing of the melt. This may represent a massive time saving.

The coating material used may be any desired coating material which, advantageously, cures rapidly, in order to allow the articles to be processed further or packaged as early as possible after sealing.

Mention may be made, by way of example, of 2-component PU coating materials, nitro lacquers or water-based coating materials.

Preferably, however, UV-curing coating materials are employed. This widespread coating system can be applied to the articles by roller application or by spraying. The subsequent curing operation takes place with UV light or UV lamps. With each application of coating material, the factors of viscosity and of UV curing through volume means that layers only approximately 10 to 20 μm thick can be applied, which is the reason why, typically, a plurality of applications of coating material are necessary.

It is indeed possible in the context of the present invention to apply the coating layer in a plurality of plies. Preferably, however, it is applied as a single ply. This is normally sufficient, since a reactive melt has already been applied as part of the sealing layer. The coating layer therefore preferably only has a thickness in the range from 5 μm to 25 μm, more preferably from 5 μm to 10 μm.

An improvement in the surface properties of the reactive melt layer can be achieved by smoothing the reactive melt layer following its (partial) application to the surface of the article. This smoothing is not always mandatory, but is preferred in the context of the present invention. It avoids surface unevennesses which could come about as a result of the simple application of the hot reactive melt, and an even smoother surface is produced.

It is advantageous to supply heat again to the surface of the reactive melt layer between the application and smoothing operations (if the latter operation is carried out), in order to achieve a further improvement in the smoothing outcome. Smoothing advantageously takes place by means of a calender roll, a steel roll for example, or a smoothing strip, which if desired may have been provided with a polyurethane coating.

It is particularly advantageous if, in the course of smoothing, the smoothing means is wetted with a release agent. This effectively prevents the as yet uncured reactive melt layer being torn from the article to be sealed, and sticking to the roll.

The release agent used can be a solvent-free and low-viscosity agent based on paraffin wax. Through the use of such an agent it is possible for the surface of the reactive melt layer to be even smoother.

The release agent based on paraffin wax may be clear and may for example have a density of approximately 0.85 g/cm$^3$ and a BROOKFIELD viscosity at 20° C. of approximately 34 mPas. A viscosity range between 30 and 500 mPas is also conceivable. The application rate may amount, for example, to approximately 20 to 35 g/m$^2$.

The release agent is applied to the smoothing means by a spraying method or vacuum spraying method, for example. The release agent may also be applied by means of an impregnated felt, which represents a particularly simple and reliable means of providing a uniform, thin film of release agent during the smoothing of the reactive melt layer.

As the release agent it is preferred to use the coating material to be applied to the article. As a result of this, the smoothing of the reactive melt layer and the application of the coating layer can take place in one operation, which has the further advantage, among others, of rapid and cost-effective sealing.

The methods of the invention can be used to seal any of a very wide variety of surface of the articles, or at least parts thereof, these articles likewise being provided by the present invention.

As well as the surfaces of elements for wood-block flooring, it can also be used, for example, to carry out at least partial sealing of the surfaces of furniture or furniture components. It should be stressed, however, that in principle the surface of any desired article can be sealed by the method of the invention, and that any article may have a sealing layer according to the invention.

The articles in question are preferably elements for wood-block flooring, which are subject to particularly exacting requirements in respect of sealing.

The surface of the article to be sealed may be composed at least partly of wood or a wood-like material, iron, non-ferrous metal, plastic, paper, cardboard, papier-mâché or a mineral substance.

The invention claimed is:

1. Method of sealing at least part of the surface of an article, comprising the steps of:
   (a) applying a reactive melt layer based on polyurethane, which melt layer normally reacts by means of the moisture present in ambient air, to at least one part of the surface of the article;
   (b) smoothing the reactive melt layer; and
   (c) preparing a combined reactive melt/coating material sealing layer by applying a UV-curing coating material to form a coating layer on the reactive melt layer, the coating layer being applied and UV-cured before the full curing of the reactive melt layer.

2. Method according to claim 1, wherein the smoothing of the melt layer and the application of the coating layer take place in one operation.

3. Method according to claim 2, wherein the coating material serves as release agent.

4. Method according to claim 1, wherein the reactive melt layer and the coating layer are each applied in a single ply.

5. Method according to claim 1, wherein the reactive melt layer has a thickness in the range from 20 μm to 150 μm.

6. Method according to claim 1, wherein the coating layer has a thickness in the range from 5 μm to 25 μm.

7. Method according to claim 1, wherein the surface of the article to be sealed is composed at least partly of wood or a wood-like material, iron, non-ferrous metal, plastic, paper, cardboard, papier-mâché or a mineral substance.

8. Method according to claim 1, wherein the article is a wood-block flooring element, a piece of furniture or furniture component.

9. Method according to claim 1, wherein the reactive melt layer is water-free, solvent-free, has a BROOKFIELD viscosity at 120° C. in the range of from approximately 2,000 mPas to 30,000 mPas, and cures through moisture present in ambient air.

10. Method according to claim 9, wherein the coating material is UV-curing, and wherein the reactive melt layer and the coating layer are each applied in a single ply.

11. Method according to claim 10, wherein the reactive melt layer has a thickness in the range from 20 μm to 150 μm, and wherein the coating layer has a thickness in the range from 5 μm to 25 μm.

* * * * *